US006331667B1

(12) United States Patent
Küppers

(10) Patent No.: US 6,331,667 B1
(45) **Date of Patent: *Dec. 18, 2001**

(54) RHYTHM INSTRUMENT WITH SEVERAL CYMBALS OF GRADUATED DIAMETERS

(76) Inventor: Peter Küppers, Kaiserstiege 143, Gronau D-48599 (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/647,176

(22) PCT Filed: Feb. 25, 1999

(86) PCT No.: PCT/DE99/00503

§ 371 Date: Oct. 19, 2000

§ 102(e) Date: Oct. 19, 2000

(87) PCT Pub. No.: WO99/50822

PCT Pub. Date: Oct. 7, 1999

(30) Foreign Application Priority Data

| | | |
|---|---|---|
| Mar. 27, 1998 | (DE) | 198 48 459 |
| Mar. 27, 1998 | (DE) | 198 13 610 |
| Oct. 6, 1998 | (DE) | 198 45 963 |

(51) Int. Cl.[7] .................. G01D 13/02
(52) U.S. Cl. .................. 84/422.3; 84/422.1; 84/422.2
(58) Field of Search .................. 84/422.3, 422.1, 84/422.2

(56) References Cited

U.S. PATENT DOCUMENTS

| | | | | |
|---|---|---|---|---|
| 3,592,097 | * | 7/1971 | Friede | 894/402 |
| 4,111,095 | * | 9/1978 | Simons | 84/422.3 |
| 4,177,709 | * | 12/1979 | Adams | 84/422.3 |
| 4,253,657 | * | 3/1981 | Rozzelle | 472/64 |
| 4,274,322 | * | 6/1981 | Cordes | 84/422.3 |

FOREIGN PATENT DOCUMENTS

| | | | |
|---|---|---|---|
| 1124438 | * | 8/1968 | (GB) . |
| 11-143458 | * | 5/1999 | (JP) . |
| 1001515 | * | 7/1997 | (NE) . |

OTHER PUBLICATIONS

C. Bruno & Son, Inc., Aug. 23, 1965.*

* cited by examiner

*Primary Examiner*—Shih-Yung Hsieh
(74) *Attorney, Agent, or Firm*—James Creighton Wray; Meera P. Narasimhan

(57) ABSTRACT

The inventive cymbal arrangement is used as an instrument (1), especially as a rhythm instrument or accompanying instrument, and comprises several cymbals (2, 3, 4) of graduated diameters. A wide range of options is provided by using different types of cymbals (2, 3, 4) which are struck against each other or played with drumsticks or brushes. The instrument (1) can also be described as a triple hi-hat. It can be mechanically or pneumatically controlled. By enabling different shapes of cymbals (2, 3, 4) to be used, the sound range of the inventive instrument is substantially increased.

19 Claims, 6 Drawing Sheets

RHYTHM INSTRUMENT WITH SEVERAL CYMBALS OF GRADUATED DIAMETERS

BACKGROUND OF THE INVENTION

The invention concerns a rhythm instrument for producing sounds by striking cymbals against each other, which are configured concave in the center and are also provided with a surrounding edge, and an operating device which makes possible to strike the cymbals against each other.

When playing music convex-shaped cymbals are also used as rhythm and percussion instruments, aside from the most different types of drums and kettledrums. Single or multiple cymbals can be used as percussion instruments with which sounds are produced with sticks or other adequate means. The cymbals can also be struck or moved against each other, while two cymbals, if possible identical in size, make contact at their edges. By striking the same against each other in this manner, the cymbals which are preferably made of metal, are shifted in their vibrations, which effects a particularly long-lasting sound. To the standard equipment of a percussion instrument belong also the so-called hi-hats. An essential part of these instruments are two cymbals, which are controlled by a pedal and are struck against each other, while producing a sound, in such a way that they—as described—meet at their edges. As a rule, the upper cymbal is movable, the lower cymbal is rigidly arranged. A spring-supported rod, which is located at the lower end inside a tube and at whose upper end is attached the upper cymbal, is pulled down by operating the pedal. The same strikes against a cymbal connected to the tube and facing toward it. In this way, the typical metallic and long-lasting sound is produced. In concerts as well as when recording on a sound carrier in a studio, hi-hats are used as rhythm instruments, which as a rule can be operated in rhythm by the foot of the drummer. The base drum is usually operated with the other foot. Such rhythm instruments, however, are also operated manually, while handles or the like are attached to the backs of the cymbals, which make possible a movement of the two cymbals toward each other. This is actually one of the oldest rhythm instruments, which is already known. The shape of this cymbal has not changed much during the course of the centuries. As a rule, they are hat-shaped, for which reason they are also called hi-hats. In the course of the decades and centuries, however, the shape has been adapted or changed under certain circumstances, the metal used has also varied, the rhythm instrument per se, however, remains unchanged in that the cymbals are tuned and shaped in such a way that they make possible different sound variations when striking against each other. This sound variation, however, is limited.

SUMMARY OF THE INVENTION

The object of the invention is to provide a rhythm instrument which makes possible a greater variety of sounds.

The object is attained according to the invention in that at least one more cymbal is assigned to the cymbals to be struck against each other, which is configured to be struck together with another one of the cymbals or separately from this cymbal against the other cymbal, with the aid of an operating device. Such a hi-hat can also be called a triple hi-hat, because at least three cymbals are available, which are guided and struck against the middle cymbal or against each other.

Such a rhythm instrument can be operated manually like the ancient rhythm instruments in that both outer cymbals are moved against the middle fixed cymbal and strike against the same and against each other. In this way, the sound multiplicity is naturally increased, especially because the two movable cymbals move either regularly and simultaneously or at different rhythms against the middle cymbal. These different striking modes already make possible the production of an essentially greater sound multiplicity, aside from the fact that, via a corresponding shaping of the different cymbals, the sound variety is considerably greater than in the rhythm instruments known until now. It is, of course, also possible to provide an operating device with which two of the three cymbals are moved against each other and against the fixed cymbal and are struck against the same and against each other.

There are basically two techniques with which a simultaneous guiding down of the upper cymbal and a guiding up of the lower cymbal against the middle cymbal, as well as a parallel movement toward each other of both cymbals can also be achieved. This is achieved, on the one hand, pneumatically with a piston and corresponding cylinder chambers wherein the compressed air is diverted in such a way that, due to the stepping on the pedal, these opposite movements also take place when the outer tube moves upward against instrument the middle cymbal, while the rod is pulled downward in the opposite direction and, in this way, strikes the lower cymbal against the middle cymbal. On the other hand, this takes place also by means of a mechanic device, wherein the movement of the pedal is diverted via a cable mechanism and an overhead pulley.

The middle cymbal is fixedly arranged particularly on an operating device to be operated by the foot, while the two other cymbals are movable against the same. By means of a corresponding configuration of the operating device, it is therefore possible to move the upper and the lower cymbal simultaneously or also with a time delay against the middle cymbal. It has been shown to be particularly advantageous when the upper cymbal and the lower cymbal are configured convex and arranged with the curvature facing away from the middle cymbal to realize an ideal vibration behavior and corresponding tones.

As already mentioned, it is particularly advantageous when the middle cymbal is fixed and the two other cymbals are configured to be movable by the operating device against the middle cymbal and against each other, so that the drummer has the possibility of fully utilizing the sound variety provided by the separately movable or also simultaneously movable cymbals.

To guarantee an optimum vibration behavior of the cymbals, and with it especially of the middle cymbal, it is provided that the middle cymbal is configured with an undulated shape. This undulated-shaped arrangement makes possible to further vary and mold the sounds as may seem fit to each drummer. It is particularly advantageous therein when the middle cymbal has radial undulated-shaped elevations which flatten toward the edge. By means of the shape, number, and expansion of the individual elevations is ensured that the middle cymbal can still vibrate to a considerable extent also in the case when it is struck simultaneously with the upper and lower cymbals, which is absolutely desirable with respect to the quality of the sound. This effect is generated by the more flexible and less rigid structure of the cymbals, but also by their enlarged surface. By means of an exchange of the middle cymbal, the drummer can realize "his" ideal and favorite sound. Naturally, especially the form of the middle cymbal can also be advantageously influenced by striking the same with a stick or another rhythm tool.

To obtain additional sound variety and variation possibilities, it is provided that the cymbal arranged under the two other cymbals has a diameter which is different from at least one of the diameters of the two other cymbals and is operated via the operating device together with the upper cymbal or separately from the same. Nevertheless, all three cymbals can have a different diameter, but two can also have the same diameter and the third a different one. Completely new possibilities are also made available to the drummer for assembling his instrument in that he can select his three cymbals with respect to the desired sound. The variation possibilities have therefore no boundaries, since a variety of combinations of the three cymbals can be realized.

A preferred embodiment of the invention ensures that the upper cymbal has the smallest diameter and the lower cymbal has the greatest diameter of the cymbals. The cymbal arranged in the middle in this arrangement also has a diameter which is between that of the other two. Of course, an exactly inverted order is also possible. By means of this arrangement, especially with three cymbals of different diameters of which the middle one has a smaller diameter than one cymbal and a larger diameter than the other cymbal is guaranteed the largest possible variety of sounds. Nevertheless, the instrument can also naturally be calibrated in any other desired way depending on the desired sound sequence or intensity.

This applies especially when at least one of the cymbals is shaped as a bell as a so-called china. By means of this shape configuration is obtained a particularly rich and long-lasting sound and, on the other hand, space is made for the middle rigidly supported cymbal.

As another measure for improving the sound quality, the invention provides that, at the points at which the cymbals strike against another cymbal, they are configured so as to make possible as large a surface of contact as possible. When two cymbals are guided against each other, their surfaces strike against each other instead of only touching at single points. In this way a fuller sound is also generated.

The invention advantageously ensures that, at the points at which the cymbals strike against another cymbal, they are configured to form a ring surface. This means that cymbals that are almost blunt can also be used. In this way, a cymbal can be played simultaneously or time-shifted with respect to the two other cymbals, while an additional variation possibility consists in that, when a rather dull sound is desired, the third cymbal strikes against two cymbals which have already been brought together, and also three almost free-vibrating cymbals are guided against each other when a rather long-lasting sound is intended.

As a further adaptation is proposed an embodiment wherein the locking devices for the cymbals are configured as hollow bodies on which air is to be impinged. These hollow bodies, which are advantageously made of plastic, allow a connection between the cymbals on the one hand, and the rod, outer tube, or jacket tube on the other hand, which can be flexibly adjusted and which represents another variation possibility. The hollow body can be flexibly or rigidly installed in correspondence with the impinging pressure depending on if a rich long-lasting or a short sound should be obtained. In addition, a slanted position of the cymbals can be achieved with the hollow body according to the invention in that these are irregularly impinged with pressure, which can be realized via a corresponding embodiment of the hollow body.

A particularly purposeful configuration of a mechanic operating device for the described triple hi-hat in one wherein the rod is pivotally connected to a pedal known per se, which is configured to act on a cable mechanism connected to the outer tube, while the cable mechanism is fixed on the outer tube via an overhead pulley. As already mentioned earlier, it is possible with such an operating device to move the upper cymbal downward against the middle cymbal and to simultaneously move upward the lower cymbal against the middle cymbal. In this way, it can be ensured by means of the operating device that all three cymbals meet at the same time or, instead, with a specific time delay, depending on the desire of the player. It is important that the player also move the rod downward with one and the same pedal movement as well as also simultaneously push upward in opposite direction the outer tube via the cable mechanism and the overhead pulley. A single pedal is then needed to operate both movable cymbals so that either another instrument can be operated with the other foot or the foot can be at rest.

According to the invention, it is also provided that the movement of the other cymbal can also be modified, for example, in the sense that it moves in the same direction as the upper cymbal. This is attained by the invention in that the pedal part of the rod is configured to couple directly over a cam driver disc. In this way, the reversal of the movement of the pedal is disengaged since the rod and the outer tube are connected to each other so that they must also maintain the same movement direction. Nevertheless, it may be necessary to configure the cable mechanism to be elastic so that an overstressing and breaking does not occur.

The overstressing and breaking are especially prevented in a spring arrangement that is assigned to the cable mechanism whose hardness is greater than that of the cylindric springs. In this way, when the outer tube moves against the pressure of the cylindric springs, the spring arrangement leads to an elongation of the cable mechanism, so that damage here is avoided. The length and configuration of the spring arrangement can be adapted to each condition, while it is necessary to provide the cable mechanism with a specific flexibility via the spring arrangement, which prevents a breaking.

Another embodiment of the invention, different from the above-described mechanic embodiment, is a pneumatic configuration, which will be described in the following, wherein the reversal of the upward or downward movement of the rod with respect to the outer tube can be achieved precisely pneumatically. For this purpose, it is provided according to the invention that a piston is assigned to the rod, while the fixed tube serves as cylinder housing with an upper and a lower cylinder chamber. Since the rod running inside the fixed tube is moved downward with the pedal, but the outer tube must be moved upward together with the lower cymbal attached thereto to guide the same against the rigid cymbal, a reversal is necessary which is obtained in that first the piston arranged in the cylinder housing is moved downward during the operation of the pedal and a pressure cushion is generated in this manner. This air cushion can seek only this one path, since the base of the cylinder housing is on the underside. The pressure generated in this manner increases with great speed so that the outer tube pushes upward with the lower cymbal connected therewith until the same strikes against the rigid middle cymbal. Instead of this air cushion, it can also be conceived to work with liquids.

It is advantageous that the lower cylinder chamber located under the piston is sealed against the atmosphere and has, via an outlet, a connection to a lower air chamber configured between the outer wall of the fixed tube and the movable outer tube, while its outlet produces a connection to the lower air chamber. The movement of an air cushion into an adjacent chamber is, of course, only possible when the same is sufficiently sealed with respect to the other chambers and the outside air. Only in this way is guaranteed that the air will actually seek out the predetermined path to produce the desired effect, here the pushing upward and later dropping of the outer tube. Eventual connections to the outside air would prevent this, since the air would seek the path of lesser resistance through these openings.

The cymbals are to be securely fixed to the linkage, while this can be supported by the earlier mentioned hollow body to be filled with air and an adaptation of the cavity of the cymbals. Each cavity has therefore a different order of magnitude and, if necessary, also a different shape.

It is nonetheless possible to assign an adapted cavity to the cavities of the rod, the tube, or the center tube, because then during mounting it can be ensured that the fixed middle cymbal and also the two other cymbals maintain their predetermined position.

Furthermore, the cavity in all or only one cymbal can have a shape that deviates from a circular shape. A triangle or oval shape is preferred, while also both shapes can be realized in a set.

Finally, all the cavities can be equal in size and/or shape, while a fixing of the rods or tubes is possible via adapters.

If the drummer, for any reason, plays temporarily with only two cymbals, this is possible when the middle cymbal is reduced to a ring which does not prevent the striking against each other of the other cymbals. The drummer can then operate his triple hi-hat with an advantageous striking dynamic. The striking dynamic is essentially determined via the springs in the mechanics.

The invention is characterized especially in that an instrument is produced, which offers numerous playing and striking variations that were not realizable until now. The user of the instrument is provided with the possibility of an operation purely by pedal as well as also by an additional playing with drumsticks, which is greatly superior to the relatively single-tone striking together of two cymbals which had been known until now.

Further details and advantages of the invention result from the following description of the corresponding drawings, in which a preferred exemplary embodiment is represented, together with the details and parts necessary therefor, wherein:

DETAILED DESCRIPTION

Figure 1:
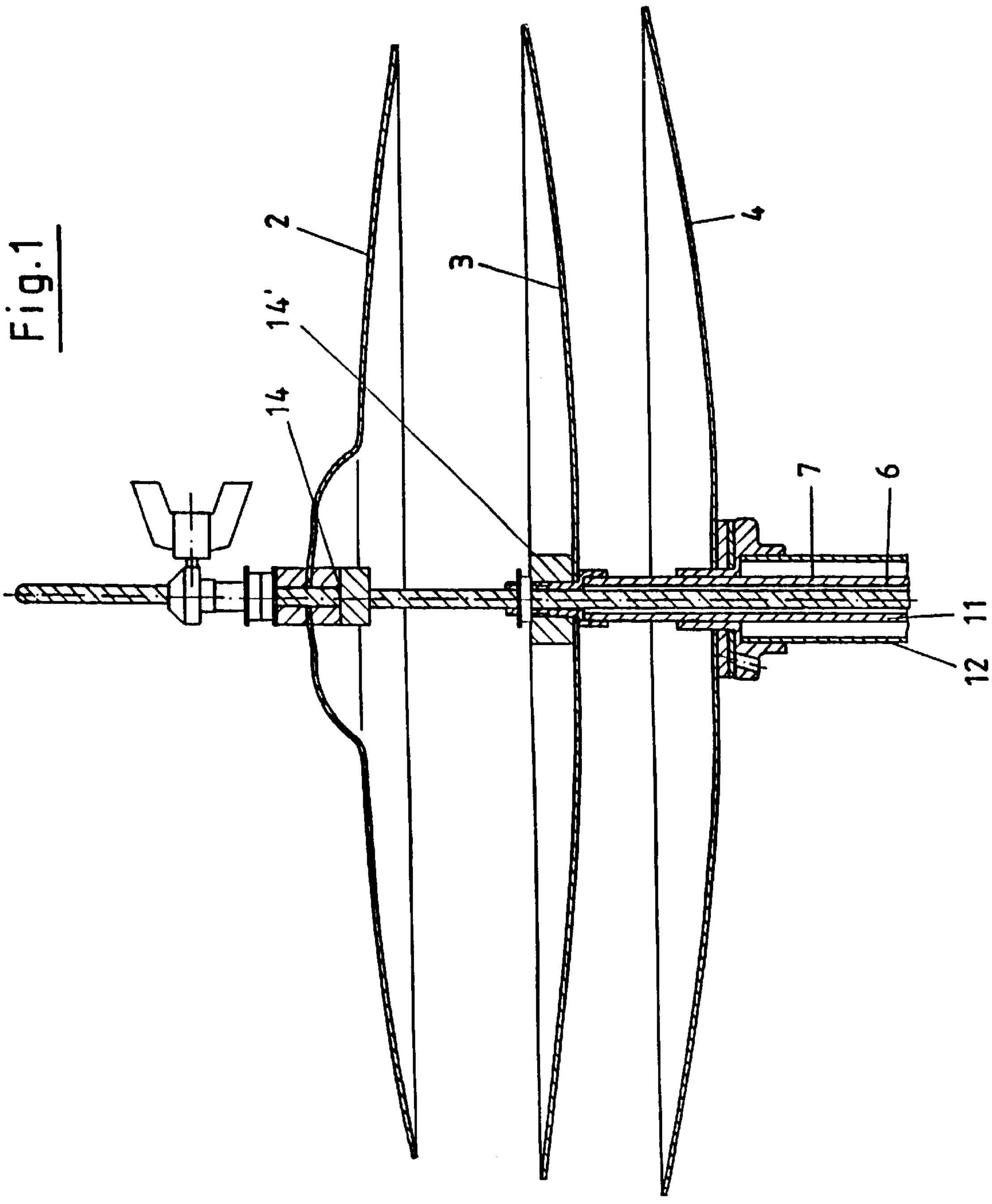
FIG. 1 shows a section of the head part of a triple hi-hat.

FIG. 1 represents the arrangement of a triple hi-hat. Not shown in this drawing is the technical solution with which the simultaneous or time-shifted striking of the cymbals is made possible. When pressing down on the pedal, the rod 7 which is firmly connected to the same is pulled down until the cymbal 2, which is connected to the rod 7, strikes against the fixed middle cymbal 3 and produces a sound. Another lower cymbal 4 is assigned to the rhythm instrument 1, which due to a pneumatic or mechanic return mechanism strikes simultaneously or different times against the fixed cymbal 3. The upper cymbal 2, the fixed cymbal 3, and the lower cymbal 4 each have a different diameter so that a considerably greater sound range results when the cymbals 2, 3, 4 strike against each other. The fixed cymbal 3 is connected to a tube 6 in which is arranged the axially displaced rod 7, both are surrounded by the outer tube 11 to which is attached the lower cymbal 4. As outer closure serves finally the jacket tube 12. The adjustment arrangements 14, 14' are produced of massive plastic in this representation, but can also be configured as hollow bodies, as described above, which can be adjusted with respect to their hardness according to the desired sound variation.

Figure 2:
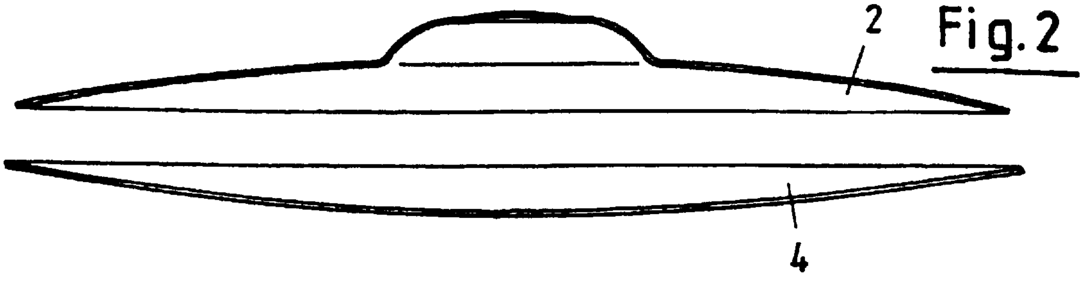
Fig.2 PRIOR ART
FIG. 2 shows the cymbal arrangement of a double hi-hat.

FIG. 2 shows a common hi-hat, which consists of an upper cymbal 2 and a lower cymbal 4, wherein the lower cymbal 4 has a greater diameter than the upper cymbal 2.

Figure 3:
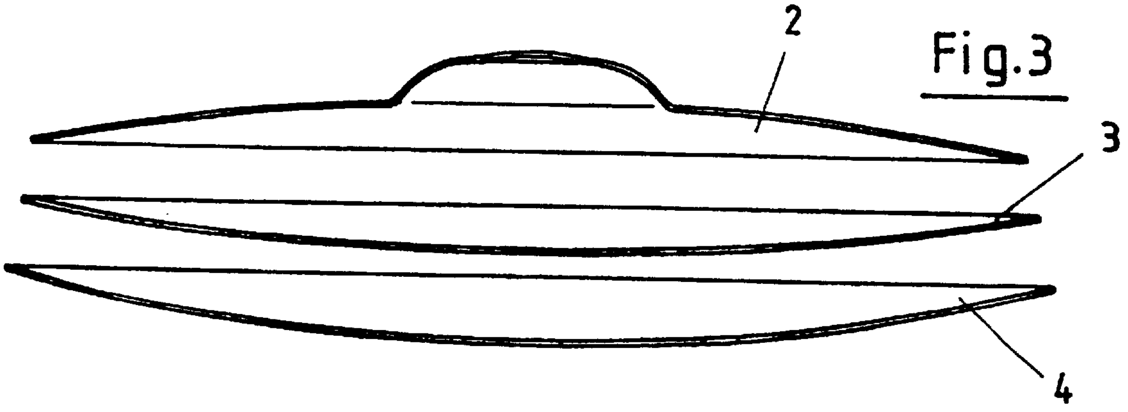
FIG. 3 shows the cymbal arrangement of a triple hi-hat.

In FIG. 3, one can see a triple hi-hat, wherein the upper cymbal 2 has the smallest and the lower cymbal 4 has the greatest diameter. The middle cymbal 3 whose diameter lies here between the two other ones, can also possess the same diameter as one of the two other cymbals 2, 4. The cymbals can also be trimmed at their edges so that the largest possible contact surface results when guiding the two cymbals against each other. In FIG. 3 as well as in FIGS. 4 and 5, it can be seen that the fixed cymbal 3 can have a variety of shapes, of which only one (not shown) has a preferred configuration. In the representation according to FIG. 3, the fixed cymbal 3 has a convex shape.

Figure 4:
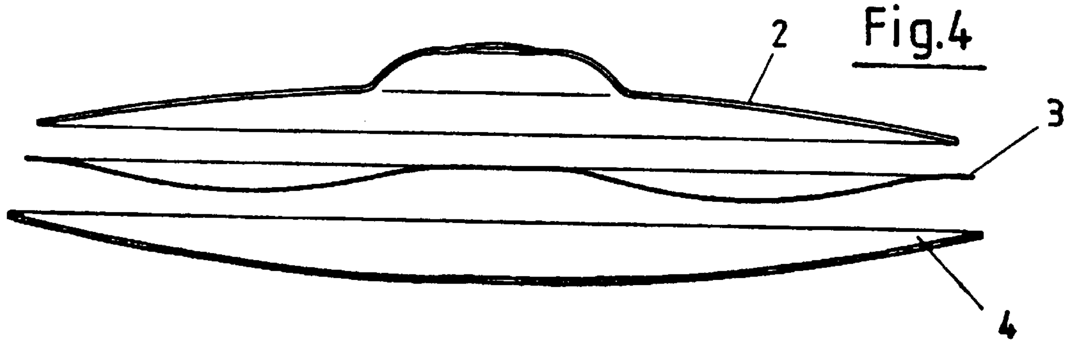
FIG. 4 shows another arrangement of a triple hi-hat with china.

FIG. 4 is then different from FIG. 3 because the fixed cymbal 3 is configured undulated in the radial direction. The number and arrangement of these waves is as desired, and can also be selected again depending on the desired sound.

Figure 5:
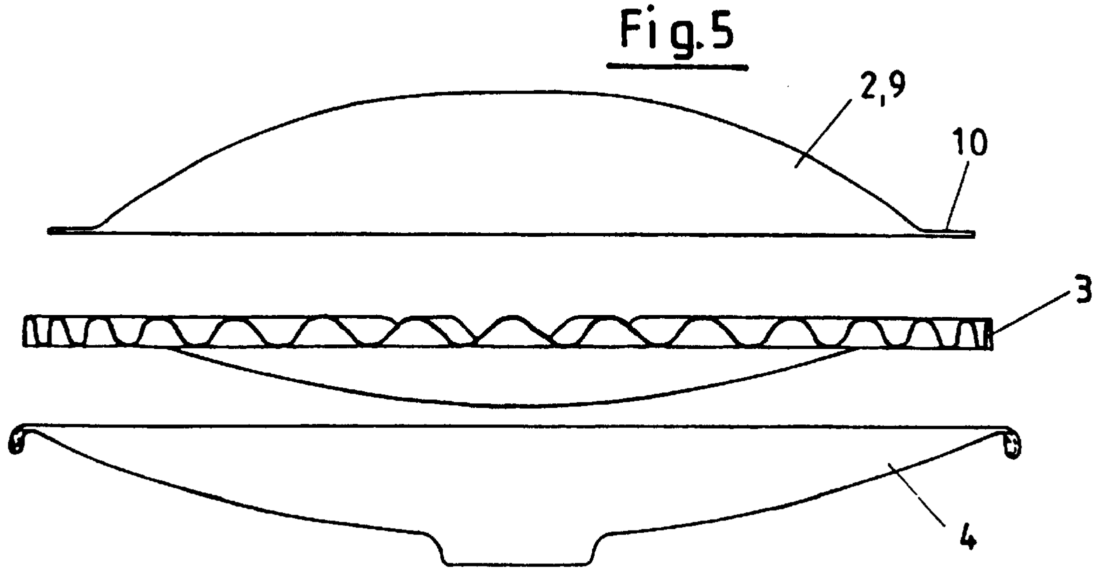
FIG. 5 shows another embodiment of a triple hi-hat with a bell-shaped cymbal.

An alternative embodiment is shown in FIG. 5, with the waves running in axial direction in the fixed cymbal 3. The upper cymbal 2 is here configured in a bell shape as the so-called china 9. The edge of this china 9 is configured as a strike ring 10, which strikes against the fixed cymbal 3 with an essentially larger surface to produce a clearly more intense sound. The lower cymbal 4 is also configured comparatively very convex.

Figure 6:
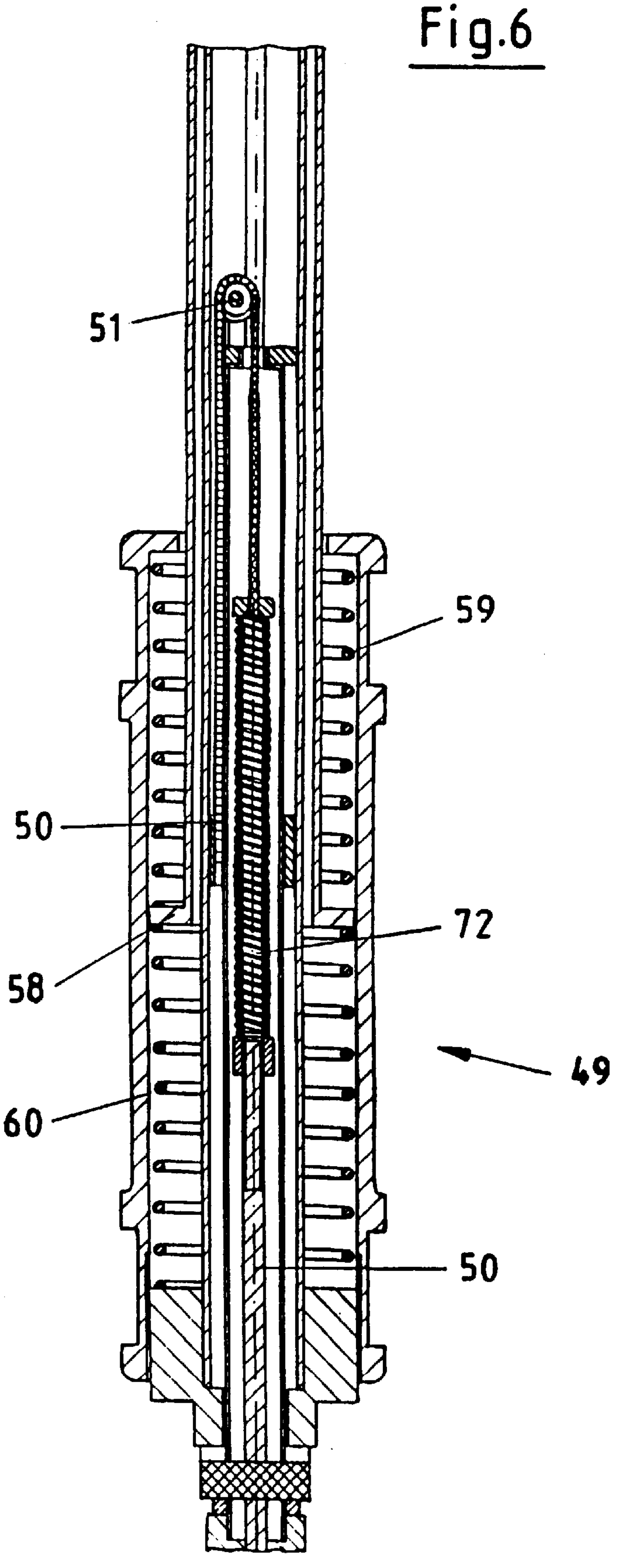
FIG. 6 shows a longitudinal section through the lower part of the standing tube with the cylinder which incorporates the cylindric springs.

FIG. 6 shows the mechanic embodiment of a triple hi-hat. The standing tube 49 which carries the cymbals 2, 3, 4 consists of different nesting tubes, while into the innermost tube, that is, the rod 7 configured here in tube shape, guides a cable mechanism 50 in such away via the overhead pulley 51, that during the upward movement of the pedals, not shown, against the pressure of the spring assigned thereto, the outer tube connected to the cable mechanism 50 is moved upward. In the region of the foot of the outer tube 24, the same is provided with a collar 58, while this collar is supported between two cylindric springs 59 and 60. These are installed in a cylinder tube which is closed on the top and bottom, so that the cylindric springs 59, 60 are supported against it and ensure that the outer tube 24 always swings back into the outlet position when the pedal is released. The foot of the outer tube is in this way guided evenly, independently thereof if the outer tube 24 moves upward or downward. At the same time, the rod 7 is moved downward as usual, so that the upper cymbal 2 connected therewith strikes against the fixed cymbal 3.

Figure 7:
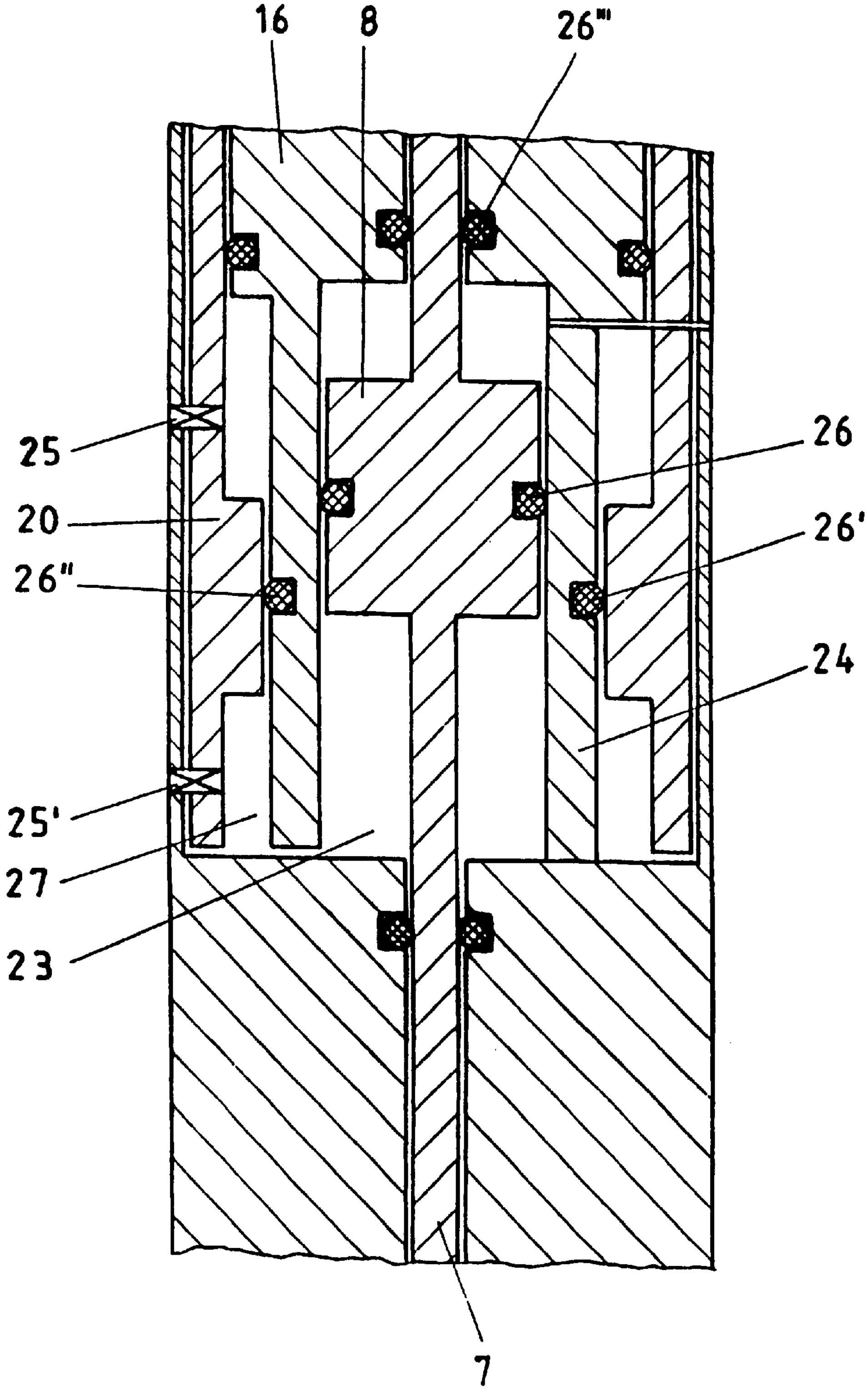
FIG. 7 shows a longitudinal section through the pneumatic operating device.

As an alternative thereto, FIG. 7 shows the pneumatic variation thereof. The piston 8 assigned to the rod 7, when the pedal is down stepped on, presses the air cushion out of the cylinder chamber 23 arranged in the cylinder housing 16 into the air chamber 27. In this way, the outer tube to which the lower cymbal 4 is attached is pushed upward. The requirement for this movement is a sufficiently large ring surface of the ring piston 20 as a possible origin for the air. By means of this arrangement, a reversal of the force is also obtained, because the pulling down of the rod 7 with the piston 8 effects an upward movement of the outer tube 24, which causes finally that the lower cymbal 4 strikes against the middle cymbal 3. Numerous here valves 25, 25' and seals 26, 26', 26", 26"' not further described guarantee these functions.

Figure 8:
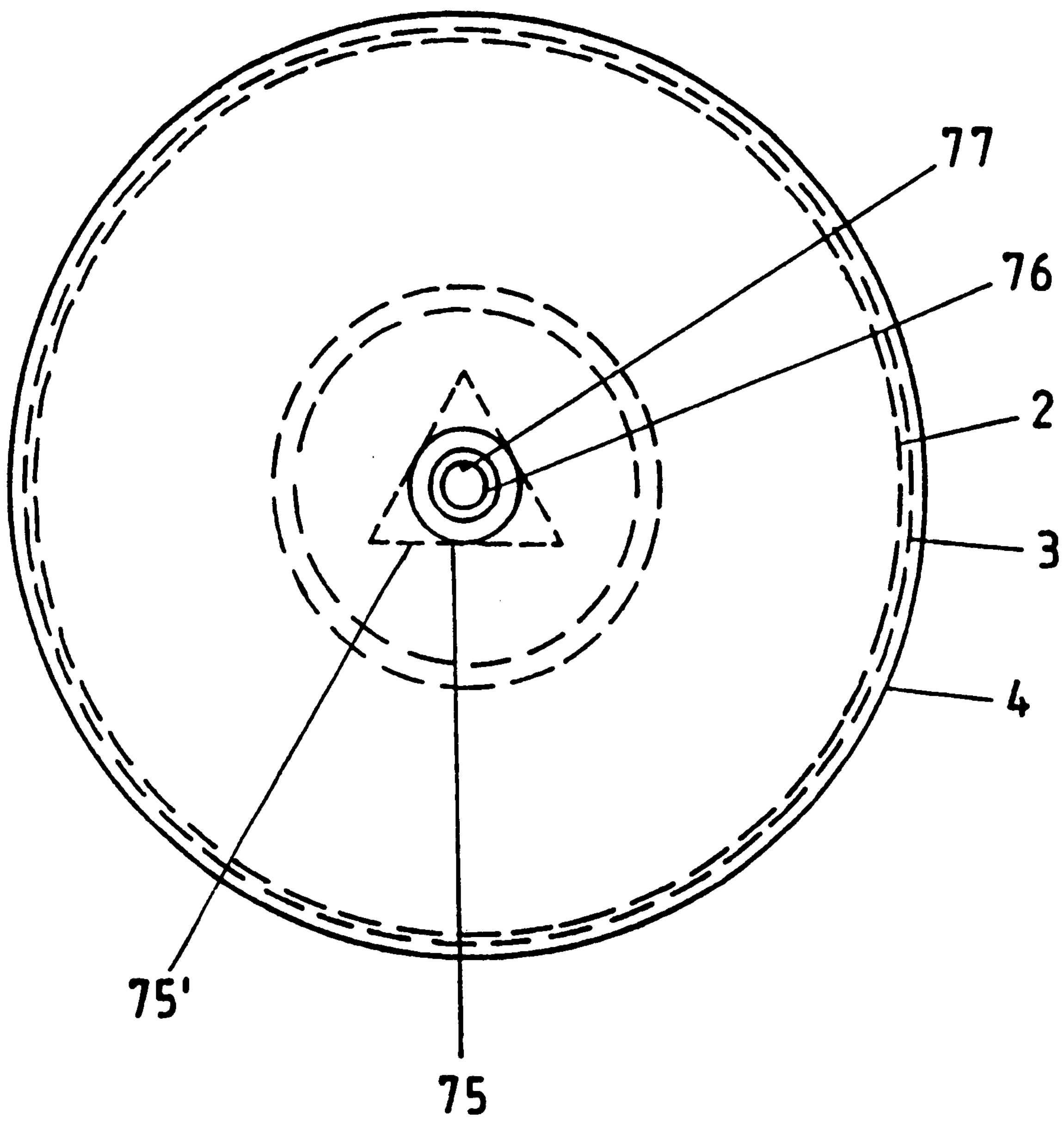
FIG. 8 shows a view of the cymbals from below.

Of the cymbals 2, 3, 4 shown in FIG. 8, only the largest cymbal 4 with the greatest diameter can be seen. It has a bore or clearance 77 in the center which, because of the jacket tube 12, also has the greatest diameter of all the clearances 75, 76, 77 of the three cymbals 2, 3, 4. The clearances 74, 76, 77 can also have a triangular or oval shape.

All the named features, even those that can only be inferred from the drawings, alone or in combination, are considered essential to the invention.

What is claimed is:

1. Rhythm instrument apparatus for producing sounds comprising an upper cymbal, a lower cymbal, the upper and lower cymbals having a central concavity with a surrounding edge, an operating device for controlling striking of the upper and lower cymbals, and at least one fixed middle cymbal controlled by the operating device for striking the upper cymbal and/or the lower cymbal.

2. The apparatus of claim 1, wherein each of the upper and lower cymbals has a convex configuration with a curvature disposed facing away from the at least one middle cymbal.

3. The apparatus of claim 1, wherein the upper and lower cymbals are movably disposed on the operating device against the at least one middle cymbal.

4. The apparatus of claim 1, wherein the at least one middle cymbal has an undulated shape.

5. The apparatus of claim 1, wherein the at least one middle cymbal has radial undulated elevations flattening towards edges of the at least one middle cymbal.

6. The apparatus of claim 1, wherein the lower cymbal has a diameter different from diameters of the at least one middle cymbal and of the upper cymbal, and is operable by the operating device together with the upper cymbal or separately from the upper cymbal.

7. The apparatus of claim 6, wherein the upper cymbal has a smaller diameter than the diameter of the at least one middle cymbal and of the lower cymbal.

8. The apparatus of claim 6, wherein the lower cymbal has a diameter greater than the diameter of the at least one middle cymbal and of the upper cymbal.

9. The apparatus of claim 1, wherein at least one of the upper cymbal, the lower cymbal and the at least one middle cymbal is bell-shaped.

10. The apparatus of claim 1, wherein the upper cymbal, the lower cymbal and the at least one middle cymbal have striking surfaces configured for a greatest surface area of contact.

11. The apparatus of claim 1, wherein the upper cymbal, the lower cymbal, and the at least one middle cymbal have ring-like striking surfaces.

12. The apparatus of claim 1, further comprising adjustments connected to the operating device for configuring the first and second cymbals and the at least one middle cymbal as hollow bodies impinged with air.

13. The apparatus of claim 12, wherein the adjustments comprise a pedal, a rod pivotally connected to the pedal, a cable mechanism acted upon by the rod, an outer tube and an overhead pulley connecting the cable mechanism to the outer tube.

14. The apparatus of claim 13, further comprising a cam driver disc for coupling the pedal to the rod and to the outer tube, and a spring arrangement with cylindric springs coupled to the cable mechanism having a hardness greater than a hardness of the cylindric springs.

15. The apparatus of claim 14, further comprising a piston coupled to the rod, a jacket tube and a fixed tube forming a cylinder housing, the housing comprising upper and lower cylinder chambers, the lower cylinder chamber being sealed against atmosphere, an air chamber between an outer wall of the fixed tube and the outer tube, and an outlet for connecting the lower cylinder to the air chamber.

16. The apparatus of claim 15, wherein the upper cymbal, the lower cymbal and the at least one middle cymbal have central openings having clearances for receiving the rod, the tube and the jacket tube.

17. The apparatus of claim 16, wherein the clearances have non-circular shapes.

18. The apparatus of claim 17, wherein the shapes are selected from a group consisting of triangles and ovals.

19. The apparatus of claim 16, wherein the clearances have identical sizes and similar shapes.

* * * * *